June 30, 1942.　　C. S. McCARTHY　　2,288,169
MECHANISM CONTROL APPARATUS
Filed April 16, 1940　　4 Sheets-Sheet 1

Charles S. McCarthy
INVENTOR

BY Braselton Whitcomb Davies
ATTORNEYS

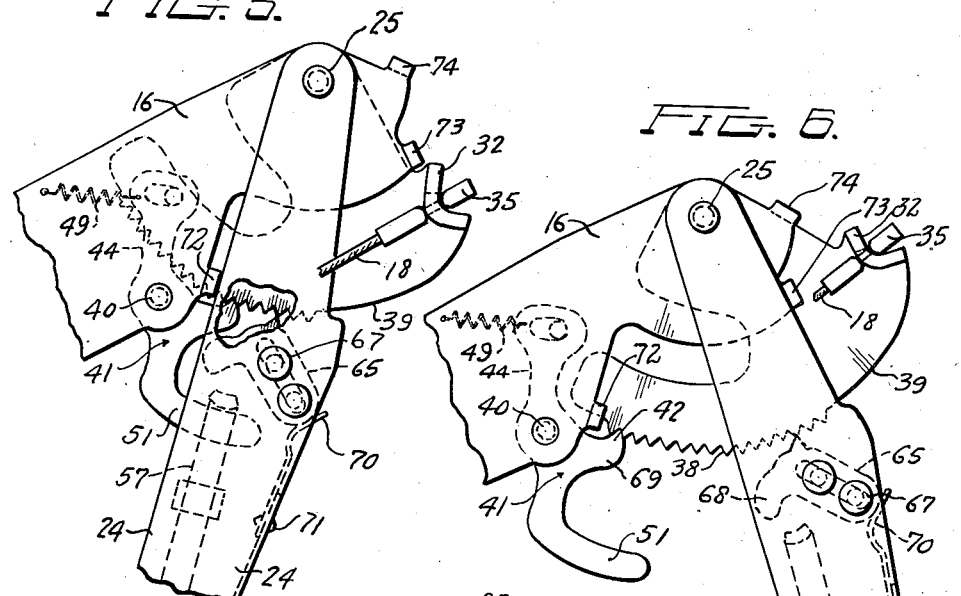
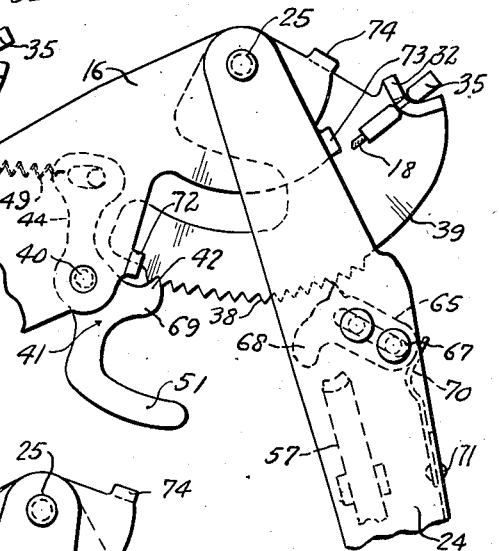
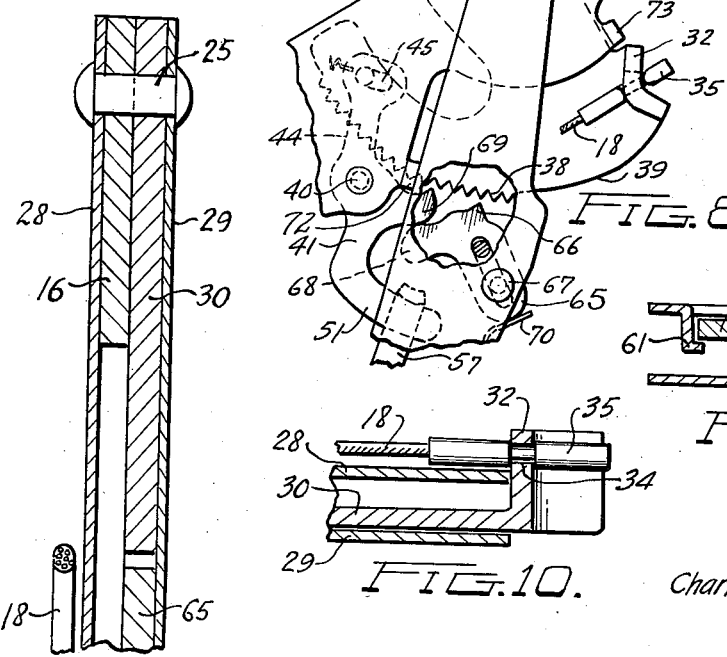
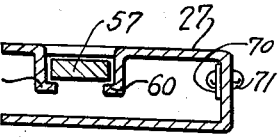

June 30, 1942.    C. S. McCARTHY    2,288,169
MECHANISM CONTROL APPARATUS
Filed April 16, 1940    4 Sheets-Sheet 3
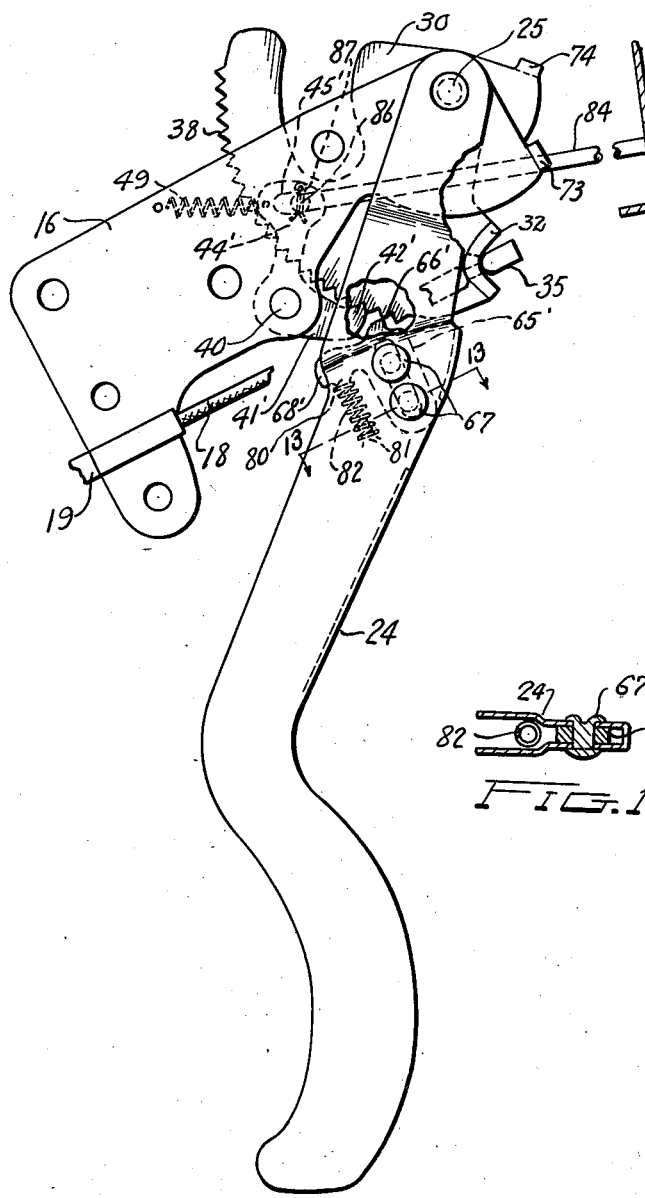
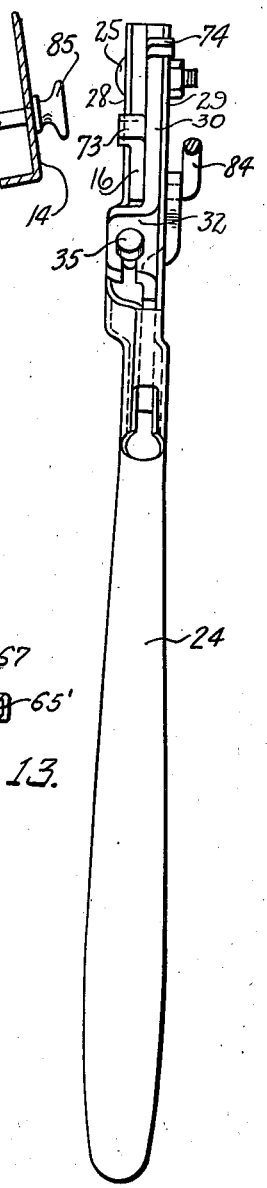
Charles S. McCarthy
INVENTOR
BY Braselton, Whitcomb Davies
ATTORNEY

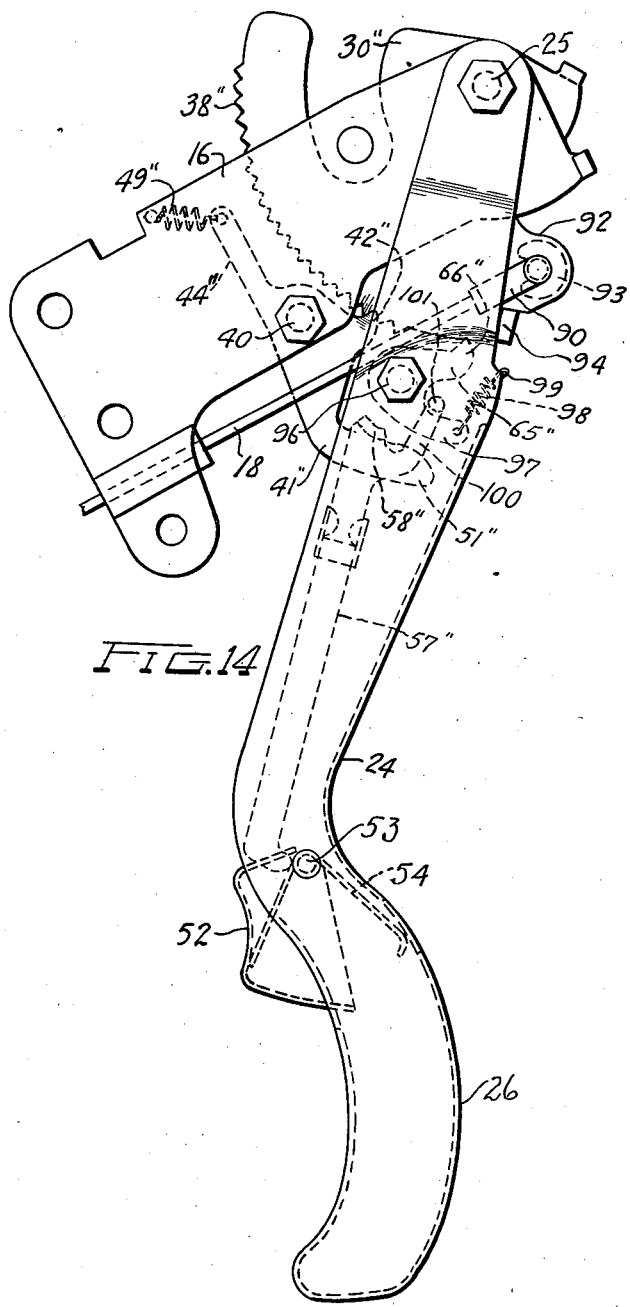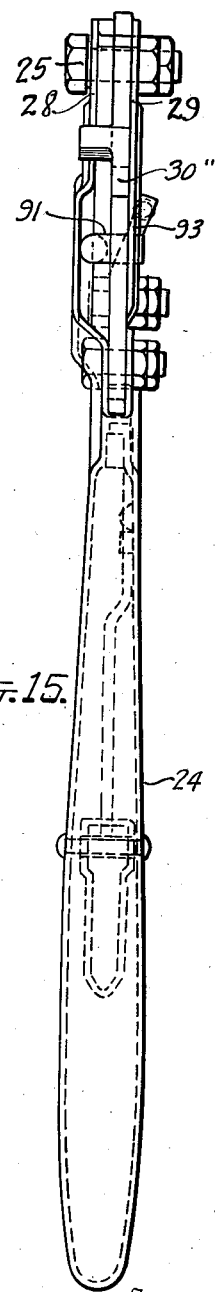

Patented June 30, 1942

2,288,169

UNITED STATES PATENT OFFICE 2,288,169

MECHANISM CONTROL APPARATUS

Charles S. McCarthy, Toledo, Ohio, assignor to The Bingham Stamping Company, a corporation of Ohio Application April 16, 1940, Serial No. 329,935

4 Claims. (Cl. 74—541)

This invention relates to mechanism actuating apparatus and more particularly to a mechanism or apparatus for actuating or controlling a braking system of an automotive vehicle.

The invention has for an object the provision of a lever arrangement for actuating the brakes of a vehicle wherein repeated movements of a brake actuating lever cause successive movements in one direction of the means connecting the lever with the braking mechanism of the vehicle.

The invention includes the provision of a novel lever arrangement wherein repeated movements of the manipulating lever cause successive movements of the brake connecting means to effect a "setting" of the brakes of the vehicle.

Another object of the invention is to provide a brake actuating arrangement wherein the manipulating lever arranged to effect a setting of the brakes may be moved at all times to a predetermined position out of the way of the vehicle operator when the brakes are in both "set" and "released" positions.

A further object of the invention is the provision of means for retaining the brakes in "set" position in which the actuating lever may be returned to the normal brake released position, the arrangement incorporating means whereby the brakes may be released without effecting movement of the actuating lever from such normal position.

The invention provides a brake manipulating mechanism incorporating a manipulating lever so arranged as to repeatedly or successively "hitch" with a means connected to the braking mechanism until the braking mechanism is effectively brought to "set" position.

Further objects and advantages are within the scope of this invention such as relate to the arrangement, operation and function of the related elements of the structure, to various details of construction and to combinations of parts, elements per se, and to manufacture and numerous other features as will be apparent from a consideration of the specification and drawings of a form of the invention, which may be preferred, in which:

Figure 5 is a view similar to Figure 4 showing the actuating lever returned to normal position with the brake actuating cable and associated mechanism retained in a brake setting position;

Figure 6 is a view of the arrangement shown in Figure 5 with the actuating lever and associated mechanism when the same has been moved to maximum brake setting position;

Figure 7 is a vertical sectional view taken substantially on the line 7—7 of Figure 2;

Figure 8 is a front elevational view of a portion of the mechanism illustrated in Figure 2 with the clutch members in disengaged position;

Figure 9 is a transverse sectional view taken substantially on the line 9—9 of Figure 2;

Figure 10 is a fragmentary sectional view taken substantially on the line 10—10 of Figure 2;

Figure 11 is a side elevational view similar to Figure 2 showing a modified form of the invention;

Figure 12 is a front elevational view of the arrangement shown in Figure 11;

Figure 13 is a fragmentary sectional view taken substantially on the line 13—13 of Figure 11;

Figure 14 is a side elevational view similar to Figure 2 showing a modified form of pawl and release mechanism;

Figure 15 is a front elevational view of the arrangement shown in Figure 14.

While I have illustrated the arrangement of my invention as incorporated in an automotive vehicle and utilized for actuating a brake mechanism thereof, it is to be understood that I contemplate the use of my invention with any mechanism wherein the same may be found to have utility.

Figure 1:
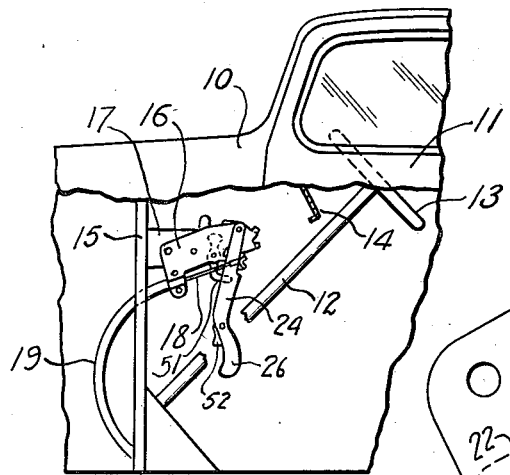
Figure 1 is a fragmentary side elevational view of the operator's compartment of a vehicle, portions being broken away to illustrate a form of installation of the mechanism actuating apparatus of my invention.

Referring to the drawings in detail and more especially to Figures 1 to 10 inclusive, and first with reference to Figure 1, there is illustrated a portion of a vehicle including a cowl structure 10, a door panel 11, steering post 12, steering wheel 13, instrument panel 14 and dashboard 15.

The mechanism actuating apparatus of my invention is preferably mounted upon a support 16 which may be secured to the dashboard 15 as shown in Figure 1 by means of a bracket 17 or to any suitable portion of the vehicle wherein the manipulating lever is arranged for convenient operation by the driver of the vehicle. The vehicle braking mechanism (not shown) is connected by means of a connector or cable 18 formed of flexible wire or the like which is housed within a sheath or guide 19 which terminates adjacent support 16 and is suitably received in a semicircular portion 20 formed on support 16, the sheath being held in place by means of a strap or clamp 21 held in place by means of clamping bolts 22. A lever member 24 is formed at its upper end with spaced wall portions or projections 28 and 29 which straddle the support 16 and are pivotally connected to the support by means of a headed shaft or rivet 25, the lever being preferably formed of sheet material and terminates at its lower extremity in a hollow handle portion 26. The lever is formed with a U-shaped central body portion 27 illustrated in Figure 9. The upwardly extending projections 28 and 29 of the lever which straddle the support 16 also straddle a movable sector 30, the latter being journalled for rotative movement about the pin or shaft 25. The sector 30 is positioned adjacent to and parallel with the support 16, and is provided with a laterally extending portion 32 having a substantial V-shaped configuration as shown at 33 which is provided with a slot 34. Secured to the extremity of the cable 18 is a fitting or connector 35 which is of a dimension to rest in the angle or V-shaped configuration 33 of the portion 32 extending from the sector, the slot 34 receiving the cable 18.

One edge of the sector 30 is provided with a smooth portion 39 and a serrated or toothed portion 38 forming a clutching surface. Pivotally secured to the support 16 by means of a rivet or pin 40 is a retaining pawl or clutch member 41 having a pawl tooth 42 arranged for cooperation with the serrations 38 on the movable sector 30, the pawl member having an upwardly extending portion 44 which is slotted as at 45 to accommodate a stop pin 46 carried by the support 16. The extension 44 of the pawl member and support 16 are provided with openings 47 and 48 in which are secured the extremities of a contractile spring 49 serving to urge the pawl member 41 into position illustrated in Figure 2, and at all times urges the pawl tooth 42 toward engagement with the depending edge of the sector 30. The pawl or clutch member 41 is provided with an extension or arm 51 which projects into the U-shaped hollow configuration of the lever body 27. Pivoted between the side walls of the lever body at the junction of the handle portion 26 with lever body 27 is a fingerpiece or trigger 52 pivotally supported upon a rivet or pin 53 which is normally urged to its outermost position by means of a hairpin like spring 54. The fingerpiece is formed with an upwardly extending wall portion 55 which is notched to receive the extremity 56 of a connecting bar or member 57, the same having a laterally extending or hook portion 58 which overtakes the arm 51 formed on the pawl member 41. One side wall of the lever member is provided with inwardly extending struck up projections 60 and 61 which form suitable guiding means to maintain the connecting member or bar 57 in proper relationship with arm 51 of the pawl member 41.

Figure 2:
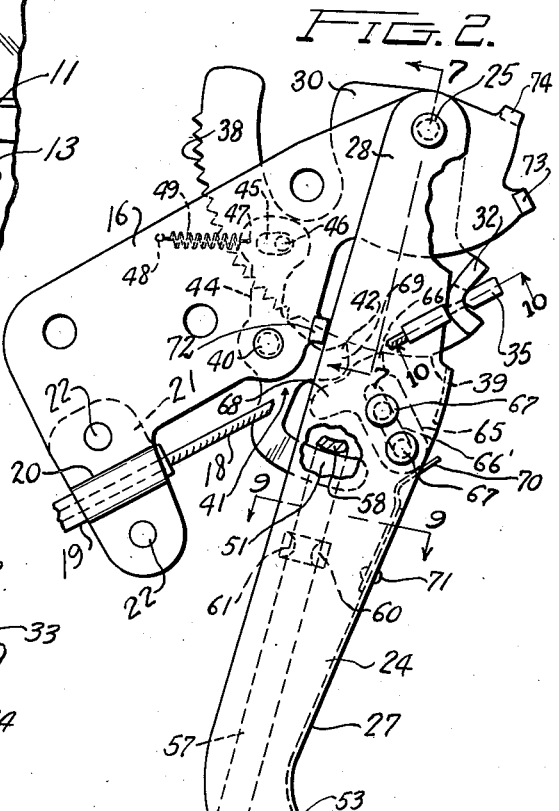
Figure 2 is a side elevational view of the lever arrangement and apparatus of my invention.
Figure 3:
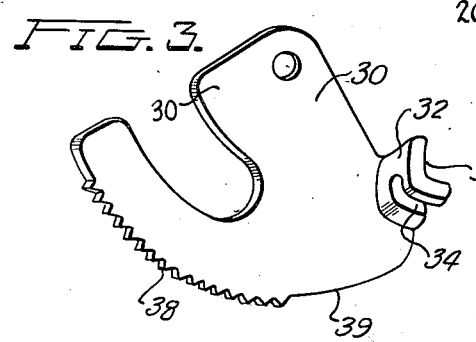
Figure 3 is an isometric view showing an element illustrated in the arrangement of Figure 2.
Figure 4:
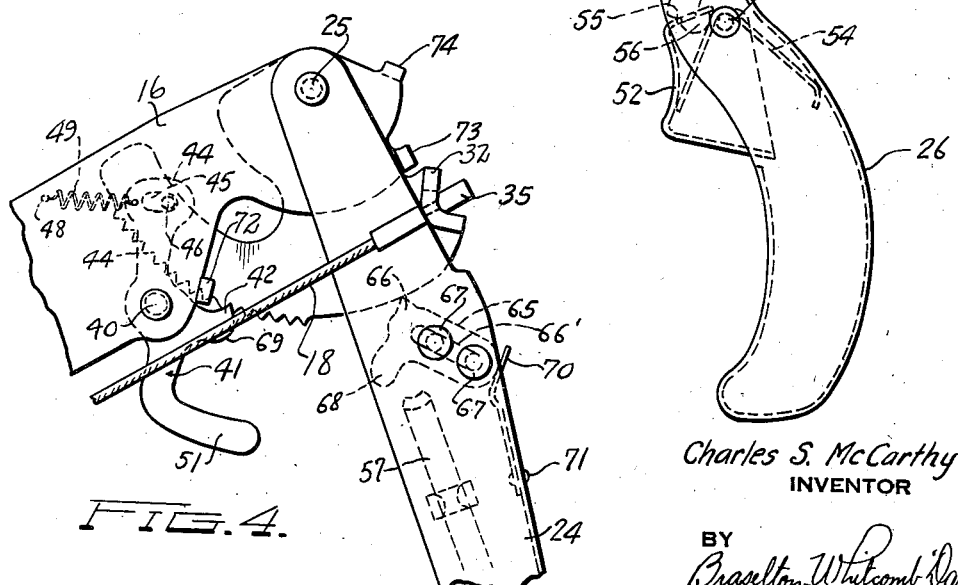
Figure 4 is a fragmentary view of portion of the arrangement illustrated in Figure 2 with the lever moved toward brake setting position.

There is provided a second pawl or clutch member 65 which is formed with a pawl tooth 66 also adapted for cooperative action with the serrated portion of the sector 30, the member 65 being provided with an elongated slot 66' and is suitably guided for slidable movement with respect to the sector and lever member by means of spaced rivets 67 passing through the side walls of the lever body 27, the rivets passing through the slot 66' yet permitting limited slidable movement of the pawl member 65. Member 65 is provided with a projection or cam portion 68 which in normal position of the lever member as shown in Figure 2 extends beneath a cam portion 69 of clutch member 41 for clutch releasing purposes as hereinafter explained. The slidable pawl or clutch member 65 is urged into engagement with sector 30 under the influence of a plate-like spring 70 secured to the bight portion of the lever body by suitable means as for example a rivet 71. The support 16 is provided with stop members 72 and 73 which extend forwardly as viewed in Figure 2 in order to limit the movements of lever member 24 as indicated in Figures 2 and 4. The support 16 is also provided with a third stop member 74 extending in a direction opposite to that of projections 72 and 73 and is arranged to be engaged by the movable sector 30 to limit the extreme oscillatory movement in one direction of the sector when the sector has been moved to the position shown in Figure 6.

The operation of this form of my invention is as follows: Figures 1 and 2 illustrate the mechanism with the brakes in "full released" position and the brake actuating lever 24 in brake released position. Under this condition, the respective pawl teeth 42 and 66 of the pawl or clutch members 41 and 65 engage the non-serrated or smooth edge portion 39 of the sector 30, the normal pull of the brake actuating cable 18 serving to retain the lateral projection 32 of sector 30 in engagement with the edge portions of the upwardly projecting side walls 28 and 29 of the lever member. When it is desired to actuate or "set" the brakes of the vehicle, the operator grasps the handle portion 26 of the lever 24 and exerts a counter-clockwise movement of the lever about the axis of the fulcrum or pin 25, the projection 32 of the sector 30 being in engagement with the edges of portions 28 and 29 of the lever extends the brake cable 18 in a direction tending to set the braking mechanism, the lever and sector being moved to the position shown in Figure 4. The maximum single movement of the lever 24 in counter-clockwise direction is limited by means of the stop member 73 engaging side wall 28 of the lever member. As the pawl member 41 is at all times urged toward counter-clockwise movement about the axis of pin 40 under the influence of spring 49, the pawl tooth 42 is thereby caused to engage a tooth of the serrated or clutch portion 38 of the sector 30 and prevents return movement of the sector so that the brake actuating cable 18 is thus retained in the position illustrated in Figure 4. If the single movement of lever member 24 is insufficient to move cable 18 an amount to satisfactorily "set" the brakes of the vehicle, the vehicle operator then oscillates the lever 24 to its original position as illustrated in Figures 2 and 5, the pawl tooth 66 overriding the teeth 38, the sector however remaining in a brake setting position as shown in Figure 5, being retained by means of the pawl tooth 42. Upon return movement of lever 24 to the position indicated in Figure 5, the pawl tooth 66 which is urged into engagement with the serrated or clutch portion 38 of sector 30 under the influence of the plate spring 70, again serves to couple the lever 24 to the sector 30 and as the operator again oscillates lever member 24 in a counter-clockwise direction about pivot 25, the sector given further movement in a counter-clockwise direction, the maximum brake setting position of the sector and lever member being indicated in Figure 6 wherein the sector engages the stop 74 to limit oscillatory movement in a counter-clockwise direction of the sector 30, the stop 73 limiting the counter-clockwise oscillatory movement of lever 24. In this position it is to be noted that pawl tooth 42 has engaged with a different tooth in the serrated portion 38 of sector 30 and holds the brakes in maximum brake setting position. The lever 24 may again be returned to its normal position as indicated in Figure 2 but the sector is held in its uppermost limit of movement or maximum "brake set" position by means of the pawl tooth 42. Thus, the braking mechanism remains in "set" position even though the lever member 24 per se has been moved to its initial or brake released position. The positions of pawl member 41, and the lever member in brake "set" positions, i. e., in the positions indicated in Figures 5, 6 and 8 are in the same relative positions as shown in Figure 2 as with the brakes in fully released position. Thus, when the operator of the vehicle wishes to effect a release of the braking mechanism, he grips the handle 26 of the lever member and exerts pressure upon the finger piece 52 to oscillate the latter about the axis of pin 53, the bar 57 will be drawn downwardly, hook portion 58 thereof engaging arm 51 of pawl member 41 withdraws the pawl tooth 42 from engagement with the serrated or clutch portion 38 of sector 30, and at the same time the cam portion 69 of pawl member 41 engages the projection or cam portion 68 of pawl member 65 causing slidable movement of the latter downwardly to also withdraw pawl tooth 66 from engagement with serrations 38. Under the influence of the brake springs (not shown) connected to cable 18, tending to urge the brakes toward released position, the sector then oscillates under such spring tension in a clockwise direction about the axis of pin 25 permitting the braking mechanism to be released. It will be noted that this is accomplished without any relative movement of the lever member 24 but only through the actuation of the finger piece or trigger 52.

In the embodiment of my invention illustrated in Figures 11 and 12, the support 16, sector 30 and lever member 24 are of substantially the same configuration and construction as heretofore described in connection with the embodiment of my invention shown in Figures 2 through 10 inclusive. In this form of the invention, however, the pawl member 65' is provided with a cam portion 68' its lower edge having a projection 80. Struck up from and integral with the side wall of the lever member 24 is a projection 81 and interposed between the projections 80 and 81 is a expansive coil spring 82 which serves to urge pawl tooth 66 into engagement with the serrated clutch portion 38 of the sector 30. In this form of the invention, the pawl member 41' pivoted about pin 40 is provided with an upwardly projecting portion 44' having an elongated slot 45'. The pawl member 41' is at all times urged in a counter-clockwise direction under the influence of spring 49 to direct pawl tooth 42' into engagement with serrated portion 38 of sector 30. In this form of the invention, the instrument panel 14 of the vehicle is provided with an opening through which extends a manipulating rod 84 provided with a manipulating button 85, the rod having a transversely extending hook-like portion 86 at its other end which projects into the slot 45' in pawl member 41', being retained therein by means of a cotter key 87.

The operation of this form of the invention is similar to that form illustrated in Figures 2 through 10 inclusive as far as movement of the lever member 24 and associated mechanism toward brake setting position is concerned. When it is desired to release the sector 30 to effect a release of the brakes, the manipulating button 85 is grasped by the operator and moved to the right as viewed in Figure 11, the portion 86 of the rod 84 engaging one wall of the slot 85' of pawl member 41' to oscillate the pawl member in a clockwise direction about the pivot pin 40 which action withdraws the retaining pawl tooth 42' from engagement with serrations 38 and at the same time the portion of the pawl member beneath the pawl tooth 42' engages the projection 68' of the slidable pawl member 65' and moves the latter downwardly to withdraw pawl tooth 66 from engagement with the serrations of the sector, thus leaving the sector free to be oscillated in a clockwise direction about the pivotal axis of pin 25 and thus effect a release of the brakes under the influence of brake springs (not shown). The provision of elongated slot 45' in pawl member 41' permits the pawl to have limited oscillation to permit the pawl tooth 42' to override the teeth 38 of sector 30 when the sector is moved through the medium of lever 24 to brake setting position.

A further modification of my invention is illustrated in Figures 14 and 15 wherein the support 16 and lever member 24 are of substantially the same construction as the form of the invention illustrated in Figure 2. This form of the invention incorporates the use of two pivoted pawls or clutch members cooperating to move and retain the sector 30'' in brake "set" position. The cable 18 is provided at its extremity with a fitting 90 having a lateral extending portion 91 extending through an opening in the portion 92 of the sector 30'', the portion 91 being provided with a circular groove which is arranged to receive a C-shaped retaining disc 93 to secure the fitting 90 in portion 92 of the sector. The sector 30'' is provided with a laterally extending lug 94 which is adapted to be engaged by the lever 24 in order to move the sector 30'' toward brake setting position. The sector retaining pawl member 41'' pivotally supported upon pin 40 is provided with a pawl tooth 42'' engageable with serrated portion 38'' of sector 30'', the pawl member having projection 44'' to which is connected spring 49'' urging the pawl tooth 42'' into engagement with the clutching surface 38''. The pawl member 41'' is formed with a projection 51'' which extends beneath a laterally extending portion 58'' of a bar 57''.

The actuating pawl member 65'' carried by the lever member is pivoted upon the lever by means of a pin or bolt 96, the pawl member having pawl tooth 66'' arranged for engagement with the clutching surface 38''. The pawl member 65'' is provided with a projection 97 to which is connected a tensile spring 98 having its other end portion taking over the bight of the lever member 24 as at 99, this spring serving to urge pawl tooth 66'' toward engagement with the clutching surface of the sector 30''. The means of effecting a simultaneous withdrawal of pawl members 42'' and 66'' from engagement with the clutching surface is accomplished by means of a projection 100 integrally formed with bar 57'', the projection 100 having a laterally extending portion 101 which extends above and transversely of projection 97.

When it is desired to effect a release of the brakes by releasing the sector 30'', the operator grasps the finger piece or trigger 52 which causes the bar 57'' to be drawn downwardly, the lateral portions 58'' and 101 thereof engaging respectively arms 51'' and 97 to oscillate both pawl members about their respective pivot shafts or pins 46 and 96 so that the pawl tooth 42'' and 66'' are simultaneously withdrawn from engagement with the teeth 38'' of sector 30'' which permits the sector its unrestrained movement in a clockwise direction to brake "release" position under the influence of the brake release springs (not shown). The operation of setting the brakes with this form of the invention is otherwise substantially the same as that of the arrangement disclosed in Figures 2 through 10 inclusive hereof.

In order to effectively control with very little effort and positively retain in any position of adjustment the vehicle brakes the position of the pawl tooth 42 of member 41 and that of pawl tooth 66 of member 65 are so arranged with respect to the serrated portion 38 of sector 30 that when either pawl tooth 42 or 66 is in a recess the other is in contact with a projection or tooth of the serrated portion as can be seen by examination of Figures 5, 6 and 11.

It is apparent that, within the scope of the invention, modifications and different arrangements may be made other than is herein disclosed, and the present disclosure is illustrative merely, the invention comprehending all variations thereof.

What I claim is:

1. In combination, a lever system, including a relatively stationary support; a lever member pivotally secured to the support; a sector pivotally carried by said support movably associated with the lever, said sector having a laterally extending V-shaped portion arranged to be connected to the load to be actuated, said lever member being normally in engagement with said laterally extending portion whereby movement of the lever toward load actuating position moves said sector in the same direction; a one-way clutch carried by said lever for establishing a one-way driving connection between said lever and said sector effective after said lever has been moved from initial position; locking means associated with said support for restraining movement of said sector in its other direction whereby repeated reciprocatory movements of said lever through said one-way clutch moves said sector in only one direction; and common means for releasing said locking means and concurrently rendering said one-way clutch ineffective.

2. In combination, a lever system including a support; a lever member pivotally secured to said support; a sector movably mounted with respect to said support and having a clutching surface; means integrally formed on said sector for connecting a load to be actuated to said sector; said lever adapted to contact with said load connecting means whereby initial pivotal movement of said lever causes said sector to impart movement in one direction to the load to be actuated; a pawl movably carried upon said support adapted to engage the clutching surface of said sector to restrain the movement of said sector in one direction; a second pawl carried by the lever engageable with the clutching surface of said sector for moving the sector upon further actuation of said lever; and single means for releasing said sector restraining pawl and rendering ineffective the engagement of said second pawl with the clutching surface of said sector.

3. Mechanism control comprising, in combination, a support; a sector movable relative to said support and having an integral laterally extending portion adapted to be connected to mechanism to be operated; a lever pivotally mounted on said support and normally engaging the laterally extending portion on said sector whereby initial movement of said lever causes corresponding movement of said sector; clutching means for establishing an operative connection between said lever and said sector rendered effective after initial movement of the lever whereby the lever and sector move in the same direction to mechanism actuated position; locking means for holding the sector in mechanism actuated position while said lever is returned to its initial position; said clutching means adapted to be moved into engagement with said locking means; and means manually operable when said clutching means is in engagement with said locking means to effect a release of said sector from its mechanism actuated position.

4. In combination, a lever system including a support; a lever member pivotally secured to said support; a sector having a clutching surface pivotally mounted on said support; means formed on said sector for connecting a load to be actuated to said sector; said lever coacting with the load connecting means formed on said sector whereby initial pivotal movement of said lever causes said sector to impart movement in one direction to the load to be actuated; a pawl pivotally carried by said support; spring means urging said pawl into engagement with the clutching surface of said sector to restrain the movement of said sector in one direction; a second pawl carried by the lever engageable with the clutching surface of said sector for moving the sector upon further actuation of said lever; and a manipulating bar arranged to engage said first mentioned pawl for releasing the latter.

CHARLES S. McCARTHY.